(12) United States Patent
Sakai

(10) Patent No.: US 8,074,211 B2
(45) Date of Patent: Dec. 6, 2011

(54) COMPUTER PROGRAM, MULTIPROCESSOR SYSTEM, AND GROUPING METHOD

(75) Inventor: Ryuji Sakai, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 12/571,064

(22) Filed: Sep. 30, 2009

(65) Prior Publication Data

US 2010/0083185 A1   Apr. 1, 2010

(30) Foreign Application Priority Data

Sep. 30, 2008 (JP) ................. 2008-255295

(51) Int. Cl.
*G06F 9/45* (2006.01)
(52) U.S. Cl. .................. 717/156; 717/149; 717/155
(58) Field of Classification Search .............. None
See application file for complete search history.

(56) References Cited

U.S. PATENT DOCUMENTS

| | | | |
|---|---|---|---|
| 5,768,594 A | 6/1998 | Blelloch et al. | |
| 7,120,903 B2 * | 10/2006 | Toi et al. ............... | 717/149 |
| 7,392,514 B2 * | 6/2008 | Edwards ............... | 717/156 |
| 7,685,587 B2 * | 3/2010 | Pozzi et al. ............ | 717/155 |
| 7,797,691 B2 * | 9/2010 | Cockx et al. .......... | 717/155 |
| 7,873,953 B1 * | 1/2011 | Pritchard et al. ...... | 717/154 |
| 7,895,586 B2 * | 2/2011 | Ozone ................... | 717/155 |
| 7,941,794 B2 * | 5/2011 | Ozone et al. .......... | 717/156 |
| 2003/0131345 A1 * | 7/2003 | Wilkerson et al. .... | 717/156 |
| 2004/0088666 A1 * | 5/2004 | Poznanovic et al. .. | 716/7 |
| 2007/0041610 A1 | 2/2007 | Kaneko et al. | |

FOREIGN PATENT DOCUMENTS

| | | |
|---|---|---|
| JP | 05-113885 A | 5/1993 |
| JP | 05-257709 A | 10/1993 |
| JP | 06-332689 | 12/1994 |
| JP | 06-332689 A | 12/1994 |
| JP | 09-171503 A | 6/1997 |
| JP | 2005-258920 | 9/2005 |
| JP | 2005-258920 A | 9/2005 |
| JP | 2006-338507 | 12/2006 |
| JP | 2006-338507 A | 12/2006 |

OTHER PUBLICATIONS

"Efficient code synthesis from extended dataflow graphs for multimedia applications", Oh et al., Jun. 2002, pp. 275-280, <http://delivery.acm.org/10.1145/520000/513990/p275-oh.pdf>.*

"Global resource sharing for synthesis of control data flow graphs on FPGAs", Memik et al., Jun. 2003, pp. 604-609, <http://delivery.acm.org/10.1145/780000/775985/p604-memik.pdf>.*

(Continued)

*Primary Examiner* — Thuy Dao
(74) *Attorney, Agent, or Firm* — Knobbe Martens Olson & Bear LLP

(57) ABSTRACT

According to one embodiment, a grouping method for process units, each including basic modules and data, the process units being assigned to processors in a program for a multiprocessor system, the program including the basic modules and a parallel statement describing relationships between parallel processes for the basic modules, the method includes displaying a dataflow graph visually showing a process status of each process unit based on the parallel statement, and specifying a candidate for a connection of process units on the dataflow graph, wherein the dataflow graph displays data entries, nodes in the basic modules, and edges connecting the data entries and the nodes.

9 Claims, 9 Drawing Sheets

OTHER PUBLICATIONS

"Using model dataflow graphs to reduce the storage requirements of constraints", Zanden et al., Sep. 2001, pp. 223-265, <http://delivery.acm.org/10.1145/510000/502910/p223-vander_zanden.pdf>.*

Sakai, "R&D Frontline, Software Optimization Technology for Multicore," Toshiba Review, Kabushiki Kaisha Toshiba, Aug. 1, 2007, vol. 62, No. 8, pp. 62-63.

Yoshida et al., "A Data Localization Scheme for Fortran Macro-Dataflow Computation," IPSJ Journal, Information Processing Society of Japan, Sep. 15, 1994, vol. 35, No. 9, pp. 1848-1860.

Kikuchi, "Parallelization Assistance System, Information Processing," Information Processing Society of Japan, Sep. 15, 1993, vol. 34, No. 9, pp. 1158-1169.

Yamaguchi et al., "Classification of Visualized Data Dependence and Its Application to Parallelization," IPSJ Journal, Information Processing Society of Japan, Oct. 15, 2006, vol. 47, No. SIG14(TOM 15), pp. 179-186.

Notice of Reasons for Rejection mailed by Japan Patent Office on Jan. 19, 2010 in the corresponding Japanese patent application No. 2008-255295.

Final Notice of Rejection mailed by Japan Patent Office on Apr. 27, 2010 in the corresponding Japanese patent application No. 2008-255295.

Final Notice of Rejection mailed by Japan Patent Office on Jul. 27, 2010 in the corresponding Japanese patent application No. 2008-255295.

Sakai, "R&D Frontline, Software Optimization Technology for Multicore," Toshiba Review, Kabushiki Kaisha Toshiba, Aug. 1, 2007, vol. 62, No. 8, pp. 62-63.

* cited by examiner

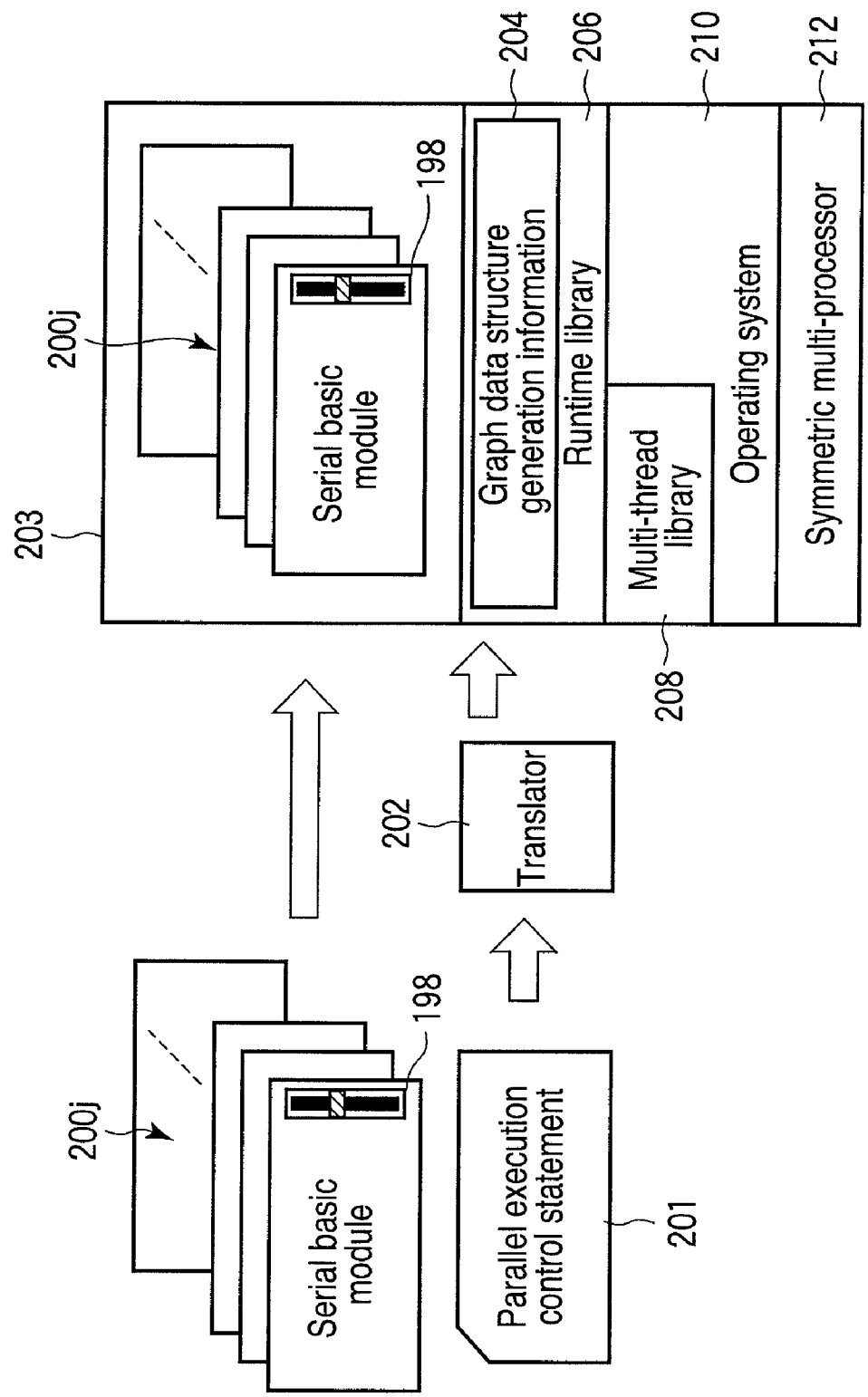
F I G. 5

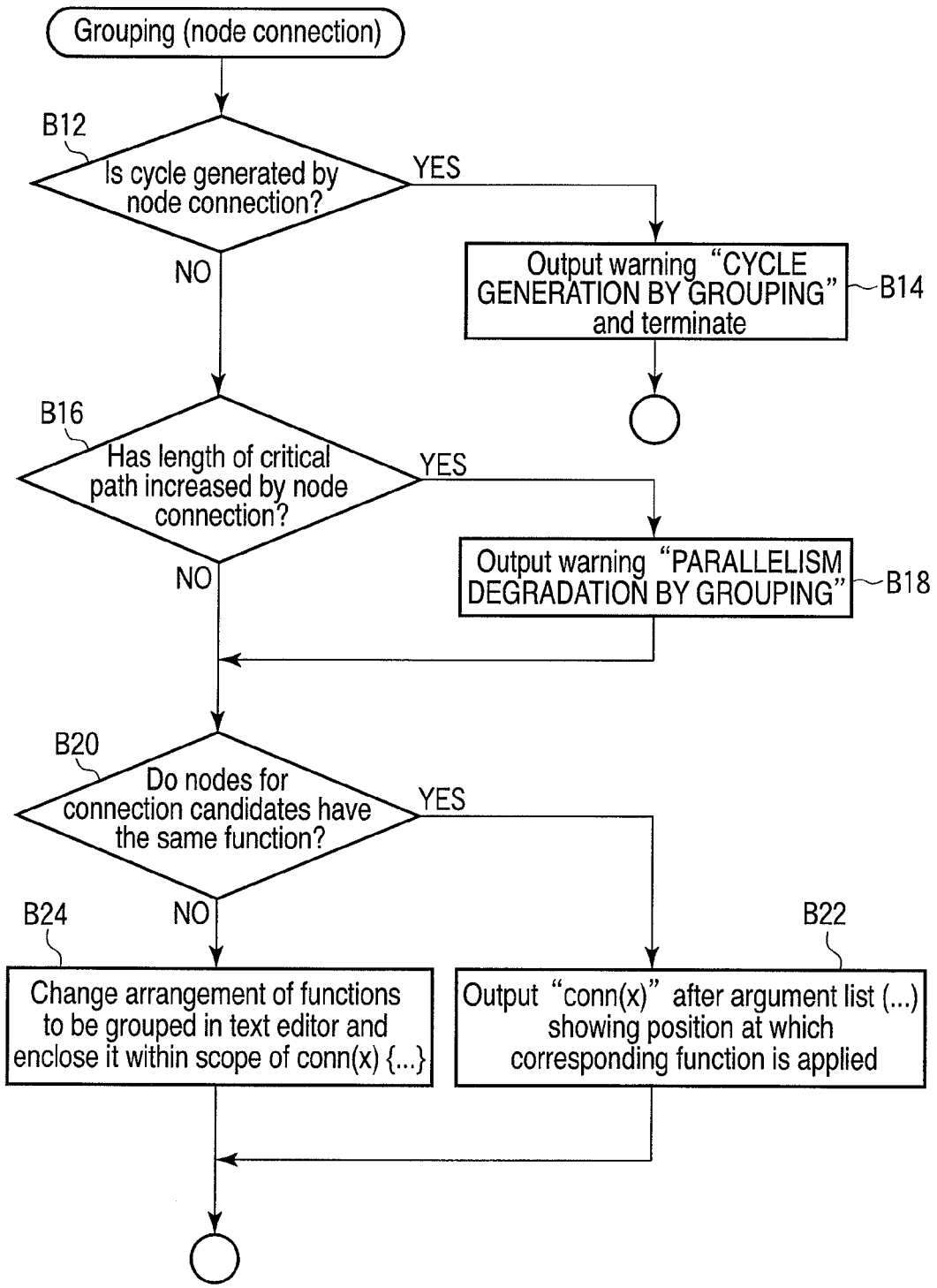
F I G. 10

COMPUTER PROGRAM, MULTIPROCESSOR SYSTEM, AND GROUPING METHOD

CROSS-REFERENCE TO RELATED APPLICATIONS

This application is based upon and claims the benefit of priority from Japanese Patent Application No. 2008-255295, filed Sep. 30, 2008, the entire contents of which are incorporated herein by reference.

BACKGROUND

1. Field

One embodiment of the invention relates to a computer program for causing a plurality of processors to perform parallel processing, a multiple processor system, and a grouping method for programming.

2. Description of the Related Art

In order to realize high speed computer processing, multi-thread processing is used, in which a plurality of tasks are processed in parallel. In a parallel processing program incorporating multi-thread processing, a plurality of threads are created and the threads have to take into account simultaneous processing by other threads. For example, to maintain the sequence of operations properly, an additional process to ensure synchronization has to be included in various parts of the program. This makes debugging of the program difficult, etc., thus increasing maintenance costs.

As an example of such a parallel processing programming, a multi-thread execution method has been proposed as described in Patent Document 1 (Jpn. Pat. Appln. KOKAI Publication No. 2005-258920 (Paragraph [0014], FIG. 7). This document discloses a method in which when a plurality of interdependent threads (in which thread 1 can be executed only after thread 2) are created, parallel processing is performed based on the result of the execution of these threads and their interdependence.

In order to perform processing while programs to be processed in parallel maintain an appropriate execution sequence, fixed dependency relationships among the programs and/or the threads have to be determined in advance. At the same time, it is also preferable to have a mechanism for dynamically adjusting the execution load of each program according to the point in its execution that the program has reached at that moment.

One of the forms for parallel processing includes two elements: runtime processing having a scheduler which assigns a plurality of process units to an execution unit (CPU); and a process unit to be processed by each execution unit. In the context of parallel processing, the size of a process unit is called granularity. Refining the granularity increases opportunities for parallel processing, thereby enhancing the parallel performance. However, if the granularity in parallel processing is too fine, it increases the frequency of scheduler operations and hence overheads. The performance thus obtained is unsatisfactory.

When the number of execution units (CPUs) is sufficient, even if the runtime overhead is increased, an improvement in performance can be sufficient by enhancing the degree of parallelism to such a level that almost all execution units will be used. When the degree of parallelism is sufficient in relation to the number of execution units, the efficiency of execution can be improved by restraining the parallelism, thereby reducing the runtime overhead.

Furthermore, in an environment in which the number of processors may be two-digits or more and in the case where memory hierarchy is multi-layer and the data communication overhead between processors is uneven, process units are assigned to processors so that any process unit involved in data transfer is assigned to the nearest possible processor. Thus the memory band width of shared memory access can be reduced. However, in order that a programmer may explicitly specify the method for assigning process units to processors, a complex task such as program rewriting is required.

A program display method has been developed, by which a program for executing such a plurality of processes in parallel is formed visually and hierarchically using graphics (e.g., Patent Document 2 (Jpn. Pat. Appln. KOKAI Publication No. 6-332689; paragraph [0056], FIG. 16)). This example uses a program development environment as a function realized as a process executed by a parallel computing machine. The program development environment includes, as a program specific to its own process, an editor, debugger and parallelism evaluation program, as described above. Also, the program development environment has a program graphical user interface (GUI) for graphically displaying the content of a source program, and for transmitting commands from a mouse or keyboard to the editor, debugger, and parallelism evaluation program. The program GUI plays the role of controlling the whole program development environment, such as transmitting commands input by a mouse or keyboard to the editor, debugger, parallelism evaluation program, etc.

The program display method as described in Patent Document 2 accepts edition of the hierarchical structure with a plurality of process units composing a program. It does not accept, however, edition involving a change in granularity for parallel execution.

In this manner, in the conventional program display method, it is impossible to edit a program for adjusting the granularity in parallel processing, which is the size for a unit of parallel processing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is an exemplary view showing an example of program translation according to the present embodiment;

FIG. 10 is an exemplary view showing a flowchart of a grouping algorithm according to the present embodiment.

DETAILED DESCRIPTION

Various embodiments according to the invention will be described hereinafter with reference to the accompanying drawings. In general, according to one embodiment of the invention, a grouping method for process units, each process unit including a basic module and data, the process units being assigned to processors in a program for a multiprocessor system, the program including basic modules and a parallel statement describing relationships between parallel processes for the basic modules, the grouping method comprises displaying a dataflow graph visually showing a "dependency" or "execution order" or "partial order of execution" of each process unit based on the parallel statement; and specifying a candidate for a connection of process units on the dataflow graph, wherein the dataflow graph displays data entries, nodes in the basic modules, and edges connecting the data entries and the nodes.

Figure 1:
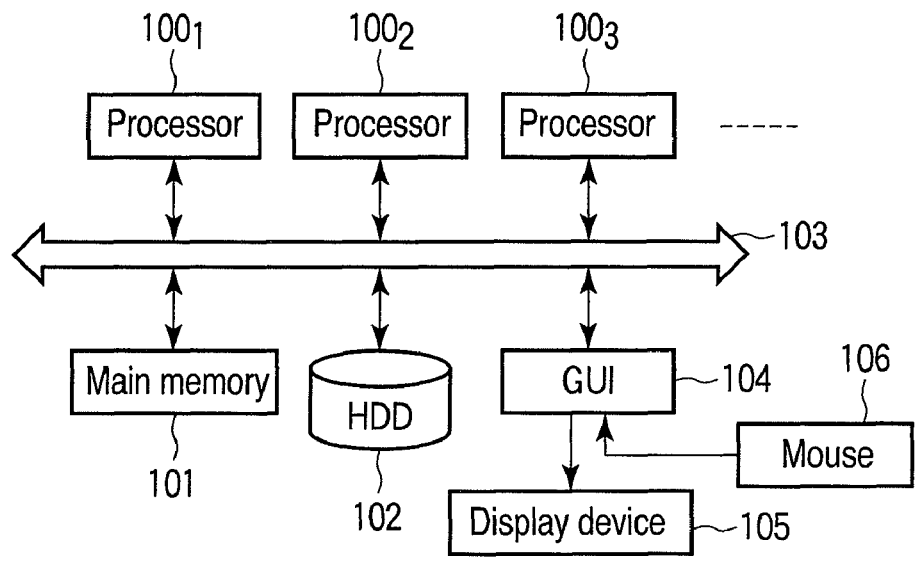
FIG. 1 is an exemplary view showing an example of a multi-processor system that performs parallel processing according to one embodiment of the present invention.

According to an embodiment, FIG. 1 shows an example of a multi-processor system for parallel processing according to a first embodiment of the present invention. A number of processors 100$i$ (i=1, 2, 3), a main memory 101 and a hard disk drive (HDD) 102, which make parallel processing possible, are connected to an internal bus 103. The processors 100$i$ interpret the program code stored in various memory devices, such as the main memory 101 and the HDD 102, and execute a process written in advance as a program. In FIG. 1, it is assumed that the three processors 100$i$ are identical in terms of processing capability. However, they need not be identical. Among these processors, there may be one with a different processing capability or one intended for processing a different kind of code.

The main memory 101 is a memory device which is composed of a semiconductor memory such as a dynamic random access memory (DRAM). A program to be run by the processor 100$i$ is read into the main memory 101, which may be accessed at relatively high speed, before processing. This program is accessed from the processor 100$i$ in accordance with the processing of the program.

Although the HDD 102 is capable of storing a larger amount of data than the main memory 101, it is often disadvantageous in terms of access speed. The program code to be processed by the processor 100$i$ is stored in the HDD 102, and only a part to be processed is read into the main memory 101.

The internal bus 103 is a common bus which connects the processors 100$i$, main memory 101 and HDD 102, so that data may be sent and received between them.

A graphic user interface (GUI) 104 for displaying programs is also connected to the internal bus 103. An image display unit 105 for displaying processing results, and a mouse 106 for entering edit commands for a dataflow graph (described below) may be connected to the GUI 104. Furthermore, a keyboard for entering data may be connected to the GUI 104.

Next, the outline of a parallel processing program will be described. In parallel processing, a plurality of programs are processed in parallel. Each program is not processed independently. That is, one program uses the result of the process of another program or, in order to ensure consistency of data, a program has to wait until a specific part of another program has finished. When processing a program having such characteristics in parallel, a system for capturing the status of each of the other related programs being executed has to be incorporated at various points in the program. Inserting this system (also known as a synchronization process) allows the authentication of data and the realization of exclusive-control-based cooperation among programs. However, inclusion of the synchronization process for parallel processing to be written into a program, considerations in addition to main logic are required, complicating the program. Also, resources are wasted while waiting for another program to run through its program. In addition, a minor wrong timing may contribute to a significant change in processing efficiency. This may make it difficult to correct a program later.

Figure 4:
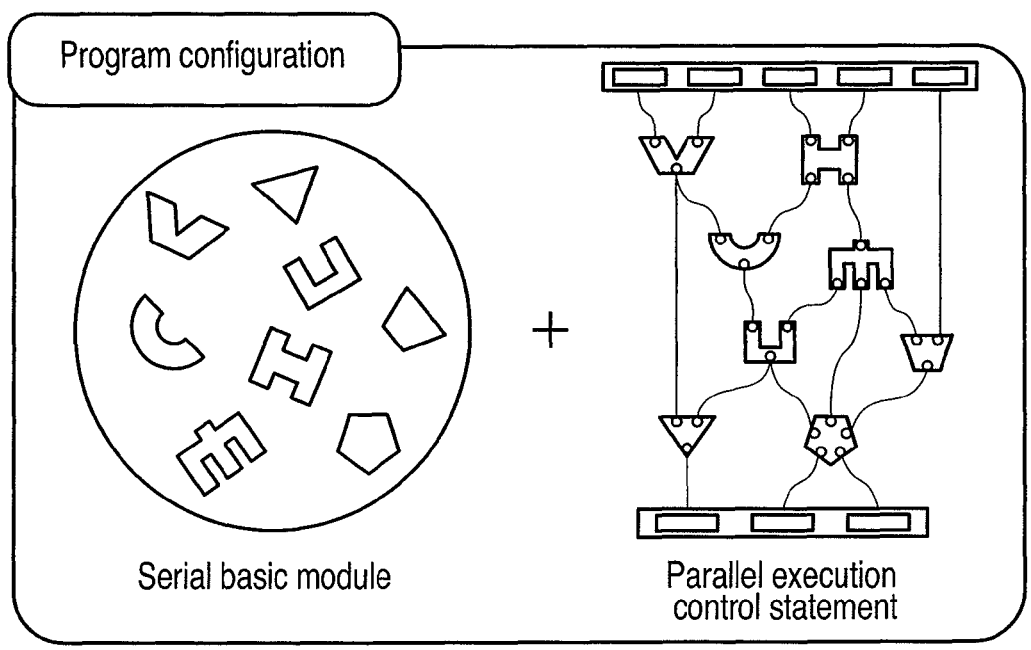
FIG. 4 is an exemplary view illustrating the configuration of a program according to the present embodiment.

To avoid this, in this embodiment, the program is divided into: a serial basic module (also referred to as a serial execution module), which is executable provided that input data is received regardless of the execution status of other programs, and which is then executed in series without synchronization; and a parallel execution control statement, which describes the relationship between the parallel processes of a plurality of serial basic modules by using graph data structure generation information in which a serial basic module is regarded as a node. A program part requiring synchronization or data transfer/reception is described in the parallel execution control statement, thus encouraging the use of a serial basic module as a separable component and allowing compact management of the parallel execution control statement. FIG. 4 shows the manner in which a program is divided into a serial basic module and a parallel execution control statement.

Figure 2:
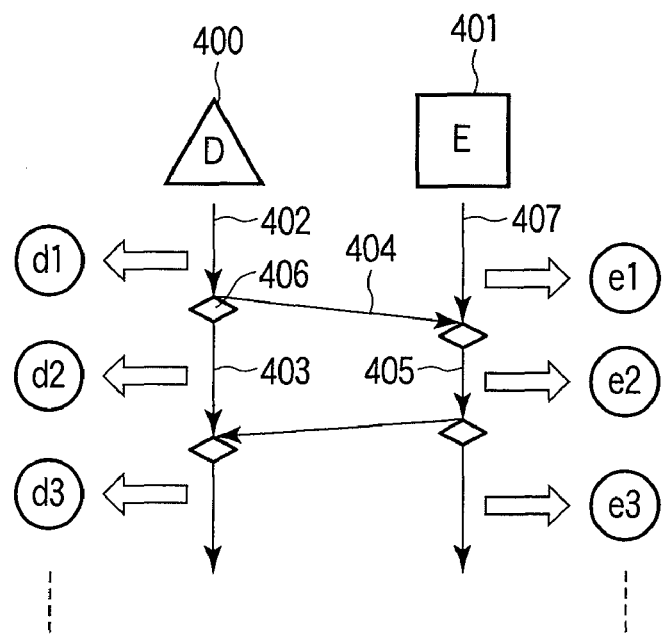
FIG. 2 is an exemplary view showing an example of a processing flow of a parallel processing program.

FIG. 2 illustrates an example of a program dividing method according to the present embodiment. FIG. 2 shows a program 400 (program D) and a program 401 (program E), which run in synchronization with each other.

The program 400 executes thread 402 while the program 401 executes the thread 407. The program 400 executes thread 402 until it reaches point 406, at which the program 400 has to transfer the processing result to the program 401. Therefore, when the execution of the thread 402 is done, the program 400 informs the program 401 of the processing result as an event 404. The program 401 is enabled to execute thread 405 only after the receipt of the processing results of both the event 404 and the thread 407. On the other hand, upon being informed of the completion of the execution of the thread 402, the program 400 starts execution of the part of the program beyond the point 406 as thread 403.

As described above, there is a point at which processing may be allowed to proceed without preconditions, such as the program 400 for the thread 402 and the program 401 for the thread 407; on the other hand, there is a point such as the point 406, at which the processing result has to be sent to another thread as the processing of the program proceeds, or there is a point at which the processing result from another thread has to be received as a precondition to start processing.

Therefore, as shown in FIG. 2, the program is divided at a point like the point 406, and, after the division, a unit of program processing is defined as serial basic modules d1, d2, d3, and so on or serial basic modules e1, e2, e3, and so on.

FIG. 2 shows two programs D and E that are associated with each other. Even when there are more than two programs associated with one another, a program can be divided in accordance with the same principle. Serial basic modules d1, d2, d3, and so on and serial basic module e1, e2, e3, and so on are those modules which can be executed without a synchronization process.

Figure 3:
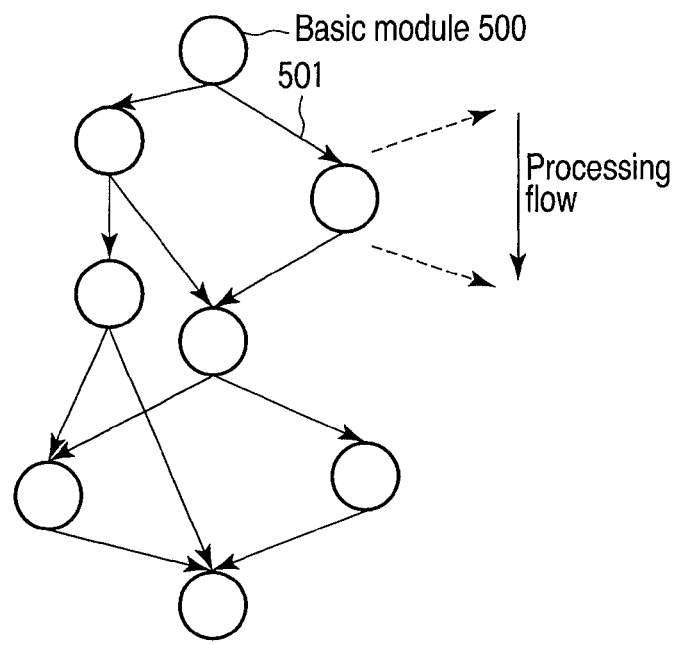
FIG. 3 is an exemplary view illustrating an example of data dependency relationship between nodes according to the present embodiment.

FIG. 3 illustrates a graphic data flow structure showing an example of the dependency relationship between serial basic modules according to the present embodiment. The dependency relationship between the serial basic modules according to the present embodiment is a relationship in which, for example, module #1 cannot be executed until module #2 is executed. A serial basic module 500, represented by a circle symbol in FIG. 3, represents either one of serial basic modules d1, d2, and so on or e1, e2, and so on described in FIG. 2. A modularized program that may start regardless of other threads, without preconditions, will be assigned as the serial basic module 500 to be executed first. The serial basic module 500 is associated with another serial basic module based on link 501 representing the dependency relationship between the serial basic modules. In a graphic data structure, a serial basic module is also called a "node".

FIG. 3 shows the dependency relationship in which each serial basic modules receives an event such as the output of a calculation result from the preceding serial basic module defined by the link 501 in terms of the association between them, and simultaneously the event is generated in the following serial basic module defined by the link in terms of the association between them. A serial basic module with a plurality of links indicates that this module requires a plurality of input data, etc., for its own processing.

FIG. 5 shows an environment in which a program according to the present embodiment is executed. A number of serial basic modules 200j (j=1, 2, and so on) represent a program executed by a system according to the present embodiment. The serial basic module 200j is configured to accept one or more parameters 198. Based on the value of the parameter 198, execution load can be adjusted, for example, by changing the algorithm applied, or by changing the threshold value or coefficient of an algorithm. The serial basic module 200j is integrated, as it is, into an information processing apparatus 203 in an execution environment.

Parallel execution control statement 201 is data referred to for execution. The parallel execution control statement 201 indicates the dependency relationship between the serial basic modules 200j when parallel processing is performed (see FIG. 3). The parallel execution control statement is converted into graph data structure generation information 204 by a translator 202 prior to execution by the information processing apparatus 203 in an execution environment. The translator 202 extracts parts pertaining to each of the plurality of serial basic modules from the parallel execution control statement. The translator 202 also generates, for the parallel execution control statement, graph data structure generation information which includes at least information that precedes a serial basic module and information that follows this serial basic module. The graph data structure generation information 204 is stored in a runtime library 206.

In addition to advance conversion prior to processing of the serial basic module 200, the translator 202 may perform processing at the same time as a sequential translation using a runtime task, etc., during execution of the serial basic module 200.

Software executed by the information processing apparatus 203 includes the serial basic modules 200j, the runtime library 206 (which stores the graph data structure generation information 204), multi-thread library 208, operating system 210 and symmetric multiprocessor 212.

The runtime library 206 includes an application programming interface (API) which is required for the execution of the serial basic module 200j on the information processing apparatus 203. It also has a function for executing exclusive control required for parallel processing by the serial basic module 200j. On the other hand, the function of the translator 202 may be called from the runtime library 206; and when the function of the translator 202 is called during the processing of the serial basic module 200j, the parallel execution control statement 201 of a part to be processed next may be converted each time. Such a configuration eliminates the need for a resident task used for translation, making parallel processing more compact.

The operating system 210 controls the whole system including the hardware and task scheduling of the information processing apparatus 203. The inclusion of the operating system 201 has the merit that a programmer is released from the task of miscellaneous control when executing the basic module 200, enabling him or her to concentrate on programming and, what is more, to develop software of a more general nature that may run even on different types of machines.

In the information processing apparatus according to the present embodiment, a program is divided in accordance with whether or not the part requires synchronization process or data reception/transfer, and then the association between these is defined as the parallel execution control statement. This encourages the use of the basic module as a separable component, thus making it possible to control the parallel processing definition in a compact manner. Execution load applied to each of the basic modules, formed as a separable component, is dynamically adjustable.

As shown in FIG. 5, by converting the parallel execution control statement 201 into the graph data structure generation information 204, and then by executing it in parallel with the runtime processing that interprets and executes it, overhead can be reduced and programming flexibility can be ensured. This runtime processing is executed by threads more than at least the number of processors. The runtime processing interprets a graphic data structure generated dynamically, selects the serial basic module 200j to be executed, and repeats execution of the serial basic module 200j while the graphic data structure is being updated, thereby realizing parallel processing.

An item of graph data structure generation information 204 may be produced by using a data structure in C language structure, or it may be expressed by byte code sequence, and serves as a virtual machine. When expressed in bytecode, a virtual machine, which is a program execution environment, interprets and executes the bytecode, thereby generating a graphic structure. Graph generation by bytecode is conducted in such a manner that when input operand data of the bytecode is not yet valid and when execution of a thread is required to obtain that input data, its processing is created as a node and then the dependency relationship between the data is added to a dataflow graph as an edge.

Figure 6:
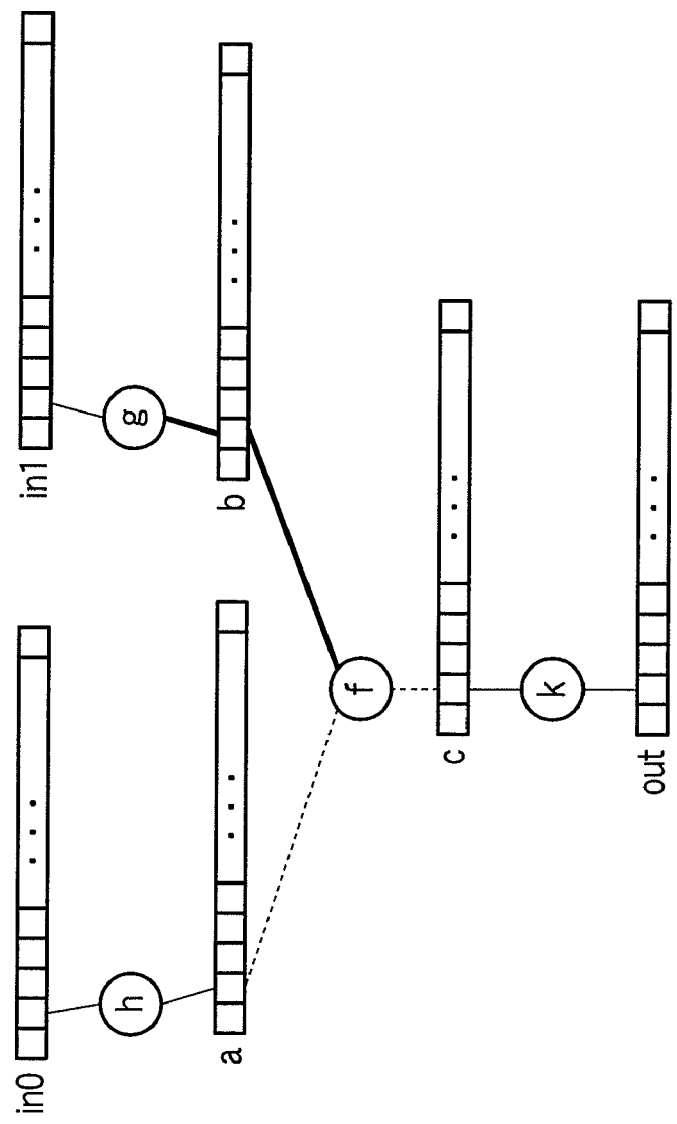
FIG. 6 is an exemplary view showing an example of a dataflow graph obtained from graph data structure generation information according to the present embodiment and a parallel execution control statement corresponding thereto.

For this reason, the GUI 104 shows on the display unit 105 a dataflow graph, as shown on the right hand side of FIG. 6, based on the graph data structure generation information 204 in the information processing apparatus 203 in the execution environment as shown in FIG. 5. The dataflow graph shows the parallel relationship between data and function (task). In this example, functions "h" and "g" act on data "in0", "in1", and function "f" further acts on the resulting data (array) "a", "b". Then function "k" acts on the further resulting data (array) "c", thereby obtaining the resulting data (array) "out".

Functions "f", "h", and "g" correspond to respective serial basic modules. The function corresponding to each of the data in the data array is called a function node.

The left hand side of FIG. 6 shows a parallel execution control statement 201, on which the dataflow graph, shown on the right hand side, is based. Editing to change granularity in parallel processing can be done by a visual editing process in which nodes of a function on a dataflow graph are connected. However, such editing can also be done by directly editing the text of the parallel execution control statement 201 and, therefore, a parallel execution control statement 201 may or may not be shown. However, this control statement 201 may be displayed in addition to a dataflow graph. The parallel execution control statement 201 may be displayed together with a dataflow graph on the same display unit 105, or it may be displayed on a display unit (text editor) other than the display unit 105.

The parallel execution control statement 201 shown in FIG. 6 is interpreted by the translator 202 as described below, which is then converted into the graph data structure generation information 204 for execution by the information processing apparatus 203.

Step #1: The following three lines are interpreted.
  local a[100];
  local b[100];
  local c[100];
Data arrays "a", "b", "c" (each having 100 entries) for memorization which are local-declared are generated (an area is secured and initialized).

Step #2: The following three lines are the definition of a function.
  a[i]: =h(in0[i]);
  b[i]: =g(in1[i]);
  c[i]: =f(a[i], b[i]);

Step #3: A "for" sentence is executed and a variable "j" is initialized to "0". When the "j" equals 100 or less, the loop main body is executed:
  for (j=0; j<100; j++){out[i]=k(c[i]);}

Step #4: In order to calculate out[0] at the body of loop, function "k" is generated. However, since argument c[0] is not defined, a node for function "k" is generated, and an edge connecting the node for function "k" and entry to c[0] is generated as data dependence.

Step #5: An attempt is made to call function "f" in accordance with c[i]: =f(a[i], b[i]), which is a function definition to obtain c[0]. However, since arguments a[0], b[0] are not defined, a node for function "f" is generated. Then edges that connect the node for function "f" and an entry to a[0] and an entry to b[0] are generated as data dependence.

Step #6: In order to obtain a[0], an attempt is made to call function "h" in accordance with a[i]: =h (in0[i]), which is a function definition. However, since argument in0[0] is not defined, a node for function "h" is generated. Then an edge that connects the node for function "h" and an entry to a[0] is generated as data dependence. As to b[0], an edge that connects the node for function "h" and an entry to b[0] is generated as data dependence.

Step #7: When in0[0] and in1[0] are already defined, the process proceeds to execution of functions "h" and "g", and then the bytecode interpretation is passed on to the following processor.

Step #8: When a series of node generation and connection are complete, the process returns to step #4, and continues execution of bytecode where i=1.

Step #9: At each phase of the parallel execution control statement 201, when an input value is determined for each of the nodes on a dataflow graph generated and developed as described above, and when execution becomes possible, the process proceeds to execution of the function (thread) that each of the nodes represents.

The dataflow graph shown on the right hand side of FIG. 6 can be generated by simulating the above operation. It is shown on the display unit 105 via the GUI 104 as shown in FIG. 1.

During the execution of the foregoing parallel execution control statement 201, the runtime processing is taken over each time a function (thread) is called. For this reason, if the threads into which a program is divided are too fine, execution of the runtime processing becomes more frequent, increasing total overhead on overall process.

Meanwhile, when the number of processors is not large, even if parallelism is extracted from fine division, a series of processes will have to be performed on the same processor after all.

When there is a hierarchy of memory, there are cases where efficiency improves by processing a group of specific nodes on the same cluster. Four groups of processors (clusters), each group consisting of eight processors sharing secondary cache, share the tertiary cache to constitute 32 (8×4) multiple processors.

Figure 7:
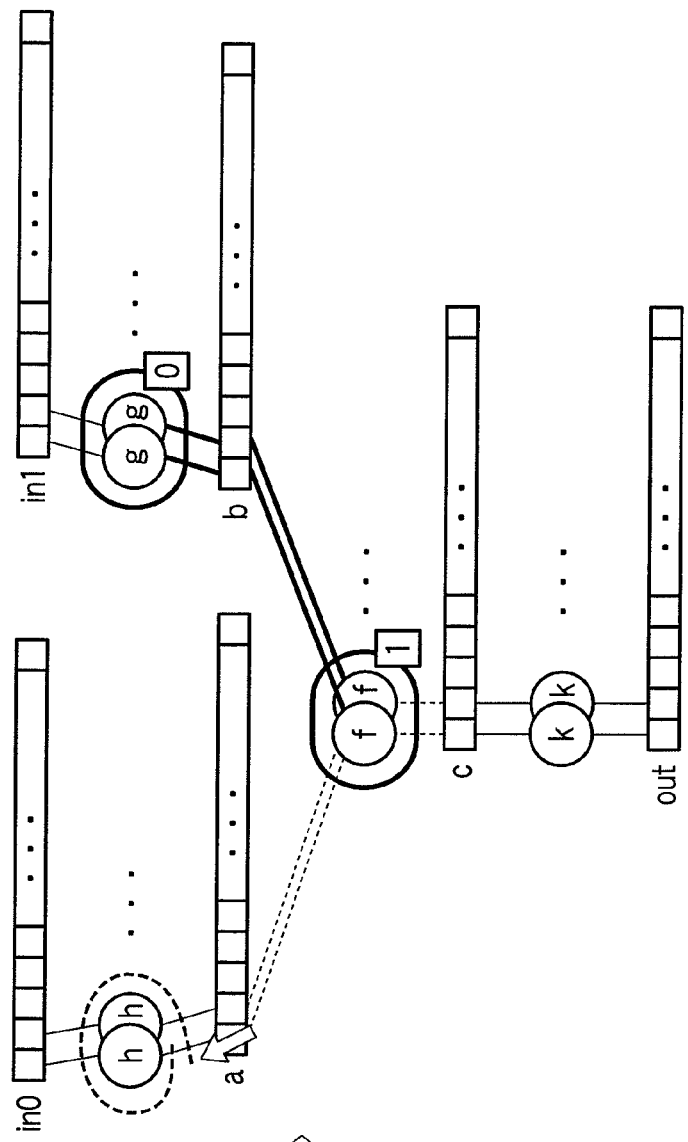
FIG. 7 is an exemplary view showing a dataflow graph according to the present embodiment and an example of grouping of data in a parallel direction in a parallel execution control statement.

Therefore, as shown in FIG. 7, a system for specifying information for making the granularity of node coarser from the dataflow graph screen is proposed.

On the dataflow graph screen, the programmer specifies a plurality of nodes which he or she wants to process as a batch without runtime intervention. FIG. 7 shows an example of grouping of a plurality of nodes for functions "f", "g", and "h" in the direction in which data are parallel. FIG. 6 shows, for convenience of explanation, only one representative function in relation to one data array. As a matter of fact, however, for entries (for example, in0[0], in0[1] and so on) to the data array, there are nodes h1, h2, and so on for the corresponding functions. On the dataflow graph screen, grouping is made by specifying or encircling with a mouse 106 a node for the functions to be grouped. Grouping for the functions "f" and "g" are completed, and entry of a value to a tab for the strength of association (priority order) of the grouping is also completed. The strength of association is a priority order in which grouping specified through programmer operation is actually carried out. As to function "h", a plurality of nodes h0, h1, and so on are shown as being encircled by mouse operation (the arrow in FIG. 7 indicates a mouse cursor). Once encirclement is complete, a tab appears in the encircling oval, prompting entry of value data for the priority order.

Figure 8:
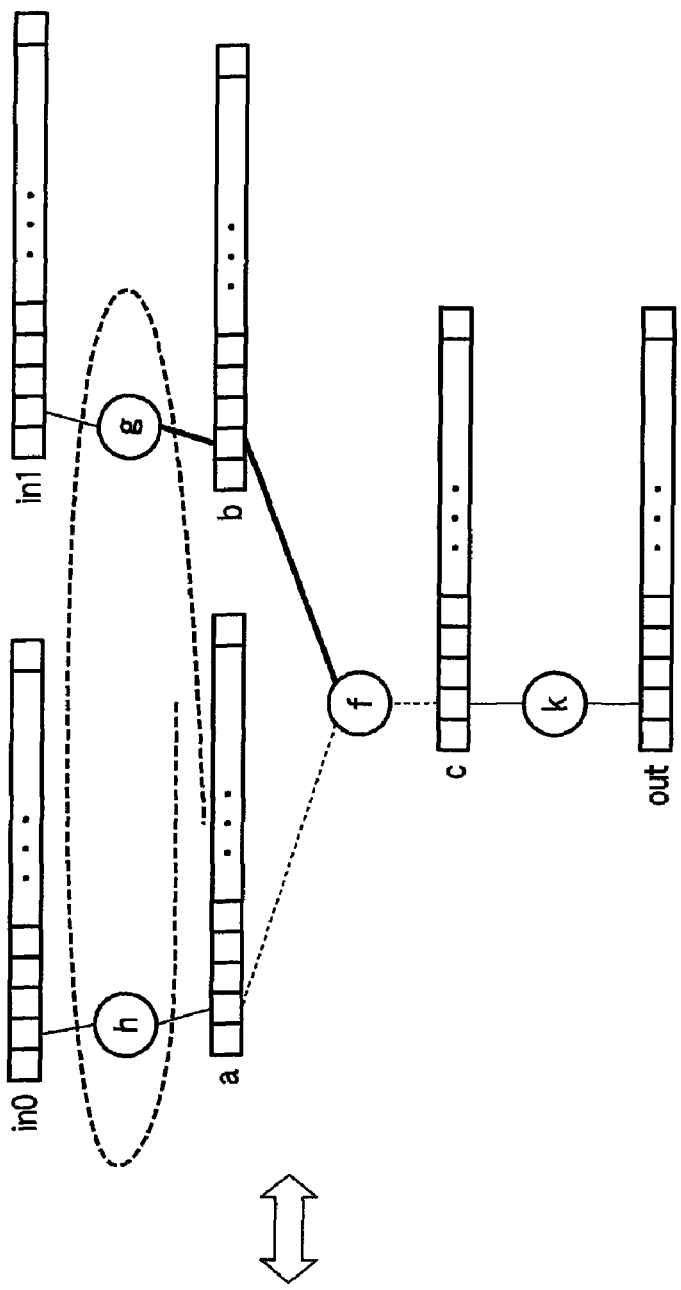
FIG. 8 is an exemplary view showing a dataflow graph according to the present embodiment and an example of grouping of tasks in a parallel direction in a parallel execution control statement.

In accordance with the grouping carried out on the dataflow graph, the graph data structure generation information changes. The grouping will be also reflected in the parallel execution control statement using reverse translation by the translator 202. That is, as shown on the left hand side of FIG. 7, annotation conn(function, x) are automatically generated at the ends of the definitions of the corresponding functions "h", "g", and "f". "x" represents strength of association.
  a[i]: =h(in0[i]); conn(h, 0);
  b[i]: =g(in1[i]); conn(g, 0);
  c[i]: =f(a[i], b[i]); conn(f, 1);
FIG. 8 shows an example where tasks are grouped in a parallel direction. The tasks correspond to their corresponding functions. FIG. 8 shows an instruction to process the functions "h" and "g" at the same time without intervention by the runtime processing. In the case of parallel grouping of tasks, grouped tasks on the parallel execution control statement are enclosed within a scope, such as conn(x){ . . . }. Order of function definition also changes automatically.

```
conn(0){
  a[i]: = h(in0[i]);
  b[i]: = g(in1[i]);
}
```

Figure 9:
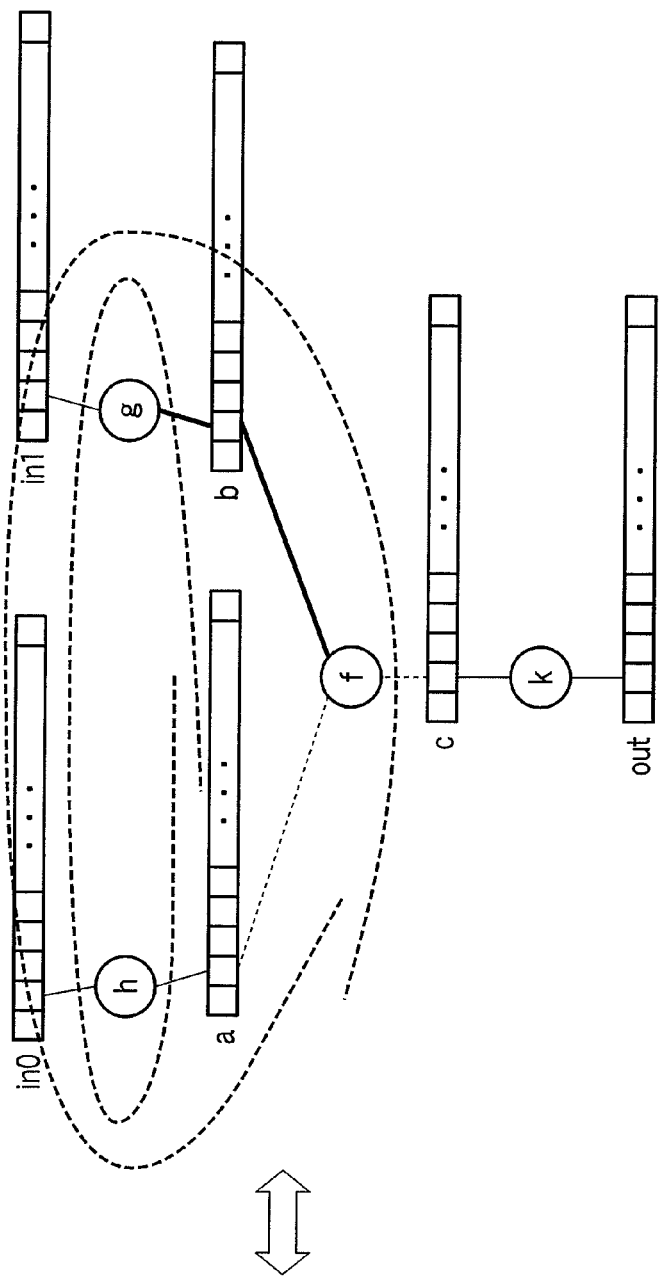
FIG. 9 is an exemplary view showing a dataflow graph according to the present embodiment and an example of hierarchical grouping of tasks in a parallel direction in a parallel execution control statement.

FIG. 9 shows an example of imparting a hierarchical structure to the grouping of tasks in a parallel direction. It shows an example of a two-layer grouping, in which the group including functions "f" and "g" and the group including function "f" are further grouped. Here, the group of functions "f" and "g" constitutes a lower layer. A higher priority order is assigned to the lower layer automatically. The hierarchical structure together with the higher priority order assigned to the lower layer makes it easier to obtain an optimum solution when determining the optimum grouping by trail and error.

```
conn(0){
  conn(1){
    a[i]: = h(in0[i]);
    b[i]: = g(in1[i])
  }
  c[i]: f(a[i], b[i]);
}
```

It is to be noted that, other than the grouping in a parallel data direction, as shown in FIG. 7, and the grouping in a parallel task direction, as shown in FIGS. 8 and 9, there is a third grouping, which is a combination of these two.

FIG. 10 shows an algorithm when grouping (connecting nodes) is performed on the dataflow graph. When an instruction to connect nodes is detected, it is determined in block B12 whether or not the grouping will cause a cycle in the dataflow graph. This determination can be made by analyzing a parallel execution control statement obtained from the reverse translation by the translator based on the graph data structure generation information 204 after the grouping. When a cycle has occurred, a warning message saying "CYCLE IS GENERATED BY GROUPING", is displayed and the ongoing grouping operation is rendered invalid (block B14).

If a cycle has not occurred, it is determined in block B16 whether or not the critical processing path deteriorates significantly due to grouping. This determination can also be made by analyzing the parallel execution control statement obtained from the reverse translation. If the critical path deteriorates significantly, a warning message saying "PARALLELISM IS DETERIORATED BY GROUPING" is displayed (block B18), thus urging a review of the necessity of the grouping.

If the critical path does not deteriorate significantly, or after a warning message is displayed in block B18, it is determined in block 20 whether or not the candidate nodes to be connected have the same function. If they have the same function, the grouping of data in a parallel direction, shown in FIG. 7, applies. Therefore, in block B22, conn(x) is written after the argument list showing the position, at which the corresponding function is applied, on the parallel execution control statement. If the functions are different, the grouping of tasks in a parallel direction as shown in FIGS. 8 and 9 applies. Therefore, in block B24, the arrangement of functions to be grouped on the parallel execution control statement changes. Then the changed arrangement is enclosed within the scope of conn(x){ . . . }.

In the above-mentioned dataflow graph, the edges that connect nodes for function and data entries are shown by simple lines. However, the thickness of line may be changed according to the volume of data transferred between the nodes and displayed. The edge connecting nodes "g" and "f", shown FIG. 6, are displayed in a thicker line than the other, indicating a larger amount of data. Grouping candidates can be determined by referring to quantities of data.

Edge lines enabling localization of data transfer between the nodes by grouping may be displayed in different colors and types. Such arrangements will provide references for determination of candidates for grouping. For the data transfer between the data arrays, "a" and "c", shown in FIG. 6, access to the main memory 101 is not required. Access to either L1 or L2 cache will suffice, thus enabling localization.

Figure 11:
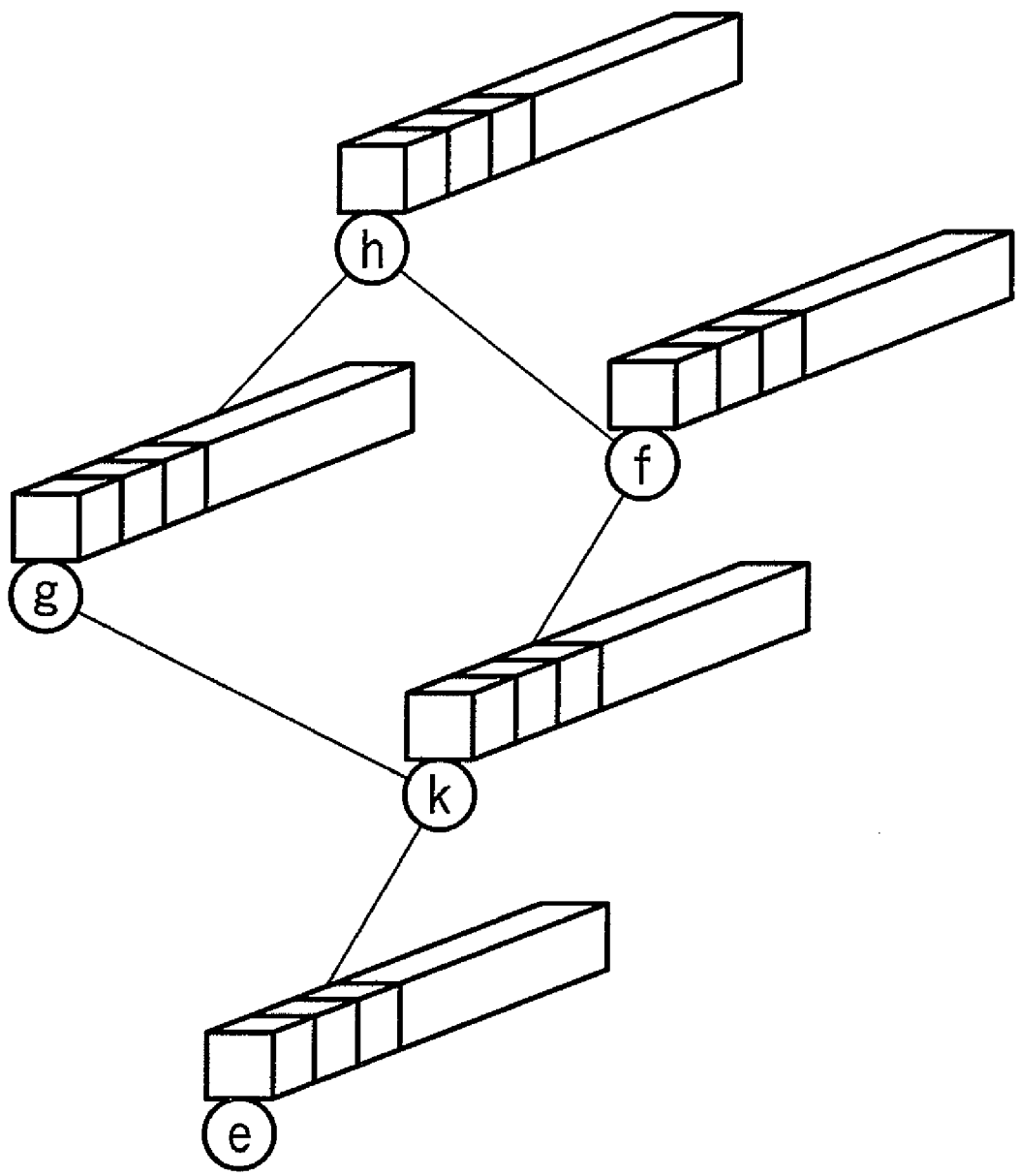
FIG. 11 is an exemplary view showing an example of three-dimensional display of a dataflow graph according to the present embodiment.

The dataflow graph described above is an example expressed two-dimensionally. However, as shown in FIG. 3, when the relationships between tasks are as complicated as the mesh of a net, a two-dimensional space may be exhausted just in displaying the tasks. In such a case, as shown in FIG. 11, the tasks may be shown two-dimensionally while the data array may be shown in a different dimension from the tasks, that is, three-dimensionally.

With the above configurations, the nodes to be connected together and the strength of association thereof can be specified on the dataflow graph that shows parallel processing for a basic module. Using these data, the parallel execution environment is kept compatible with the number of processors and memory hierarchy. If the overhead on runtime processing is large with sufficient parallelism, nodes are connected according to the priority order of strength of association, thereby reducing the frequency of runtime switching. At the same time, when locality of a hierarchy of memory is required, optimization is possible by assigning a node to a cluster, group by group, etc.

In grouping, if array data becomes superfluous due to the grouping, data transfer cost may be greatly reduced. Highlighting such array data in advance makes the programmer aware of the points at which the effect of grouping is high.

As described above, based on the parallel statement describing parallel processing of basic modules, the present embodiment displays a dataflow graph including: a plurality of data entries; a plurality of nodes for basic modules; and edges that connect the plurality of data entries and the plurality of nodes for basic modules. Specifying with a mouse the candidates for node connection on the dataflow graph makes it easy to change the granularity in parallel processing almost by instinct.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. A grouping method for threads, each thread comprising basic modules and data, the thread being assigned to processors in a program for a multiprocessor system, the program comprising the basic modules and a parallel statement describing relationships between parallel threads for the basic modules, the grouping method executed in the multiprocessor system comprising:

displaying a dataflow graph visually showing a parallel relationship between the data and the basic modules based on the parallel statement when the program is executed;

selecting a basic module group for grouping a basic module indicated by a node of the dataflow graph and a priority for grouping in accordance with a user input;

changing graph data structure generation information for displaying the dataflow graph in accordance with a selection of the basic module group; and making the basic module group to be reflected in the parallel statement in accordance with the changed graph data structure generation information, wherein the dataflow graph comprises data entries, nodes in the basic modules, and edges configured to connect the data entries and the nodes;

wherein at least said displaying is implemented by computer hardware.

2. The method of claim 1, further comprising:

displaying the parallel statement in text; and selecting the basic module group by correcting the parallel statement in text in accordance with a user input.

3. The method of claim 2, further comprising issuing a warning and invalidating a selection of the basic module group when a cycle occurs in the data flow due to a reflection of the basic module group to the parallel statement.

4. The method of claim 2, further comprising issuing a warning when a critical path in the dataflow graph is degraded due to a reflection of the basic module group to the parallel statement.

5. The method of claim 1, wherein displaying the dataflow graph comprises changing a thickness of the edges according to a quantity of data transferred between the nodes.

6. The method of claim 1, wherein selecting the basic module group comprises selecting a node of the dataflow graph.

7. The method of claim 1, wherein selecting the basic module group comprises selecting basic modules related to different entries in a same data arrangement or basic modules related to different data arrangements as a group.

8. A multiprocessor system for parallel computing by executing a program comprising basic modules and a parallel statement describing relationships between the parallel threads of the basic modules, the multiprocessor system comprising:

a storage system configured to store the program; and multiple processors configured to execute the program;

wherein the program comprises grouping threads assigned to processors, each thread comprising the basic module and data;

the grouping comprises:

displaying a dataflow graph showing visually a parallel relationship between the data and the basic modules based on the parallel statement when the program is executed;

selecting a basic module group for grouping a basic module indicated by a node of the dataflow graph and a priority for grouping in accordance with a user input;

changing graph data structure generation information for displaying the dataflow graph in accordance with a selection of the basic module group; and making the basic module group to be reflected in the parallel statement in accordance with the changed graph data structure generation information, wherein the dataflow graph comprises data entries, nodes in the basic modules, and edges configured to connect the data entries and the nodes.

9. The multiprocessor system of claim 8, wherein the program further comprises displaying the parallel statement in text, and selecting the basic module group by correcting the parallel statement in text in accordance with a user input.

* * * * *